July 25, 1961     L. H. DUNN ET AL     2,993,980
METHOD FOR MAKING TUBULAR STRUCTURE Filed July 30, 1959     2 Sheets-Sheet 1

WITNESSES
John E. Heasley Jr.
H. M. Snyder

INVENTORS
Warren M. Trigg &
Lewis H. Dunn
BY
Frederick Shapo
ATTORNEY

July 25, 1961 L. H. DUNN ET AL 2,993,980
METHOD FOR MAKING TUBULAR STRUCTURE
Filed July 30, 1959 2 Sheets-Sheet 2

United States Patent Office 2,993,980
Patented July 25, 1961

2,993,980
METHOD FOR MAKING TUBULAR STRUCTURE
Lewis H. Dunn, Blairsville, Pa., and Warren M. Trigg, Orchard Park, N.Y., assignors to Westinghouse Electric Corporation, East Pittsburgh, Pa., a corporation of Pennsylvania
Filed July 30, 1959, Ser. No. 830,613
5 Claims. (Cl. 219—50)

This invention relates to the manufacture of tubular structures, and is particularly directed to the heat treatment of heat exchanger tubes which have been shaped to a desired configuration.

There is a requirement in many heat exchangers for tubes in the shape of a U. The tubes may range in size up to a total length of more than thirty feet. Tubes which are to be used at elevated temperatures and in corrosive environments are preferably made of stainless steel or other corrosion resistant alloys. One important approach to the corrosion problem in stainless steel heat exchanger tubes is the prevention or elimination of residual stresses in the member since stainless steel is susceptible to stress corrosion at elevated temperatures. For this reason, it is necessary that the heat exchanger tubes be accurately formed so that stresses are not introduced by the simple operation of mounting the tubes on the heat exchanger body. However, the forming operation required inherently introduces stress into the formed member. These internal stresses may be relieved by appropriate heat treatment, but the relief annealing of these stresses by known techniques is invariably accompanied by distortion of the tube. As indicated above, the mounting of such a distorted tube on the heat exchanger body would re-introduce objectionable stresses.

It is the object of this invention to provide a method for manufacturing long U-shaped heat exchanger tubes in which the U-tubes are annealed by passing electrical current through the tubes to eliminate stresses caused by the shaping operation while being held in a powdered restraining medium which is electrically and thermally insulating during the annealing treatment to prevent distortion.

It is another object of this invention to employ a loose refractory insulating material, such as sand or zirconium silicate, as a restraining medium for elongated tubular members being electrically heated during an annealing process.

Other objects and advantages of the invention will become apparent hereinafter.

For a better understanding of the nature and objects of the invention, reference should be had to the following detailed description and drawings, in which.

The invention is directed to a method for producing a curved metallic member which comprises bending the member to a desired shape, embedding the member in a packing of a loose refractory material which is electrically and thermally insulating, heating the member electrically to annealing temperature, cooling, and removing the loose refractory material from the annealed member.

More particularly, the invention relates to a stainless steel heat exchanger tube which has been bent to a hairpin or U-sape. Examples of the loose refractory packing material are sand and zirconium silicate. The heating is accomplished by passing an electrical current through the tubular member until its temperature is at the desired annealing point. A flow of hydrogen or other non-oxidizing, non-carburizing gas is maintained through the tube during the annealing process. The process is particularly suitable for U-tubes wherein the length is at least 100 times the diameter of the tube.

Figure 1:
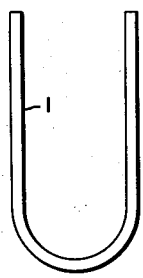
FIGURES 1, 2 and 3 are plan views of a heat exchanger tube as formed and two common distorted tube forms.
Figure 2:
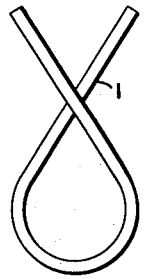
Figure 3:
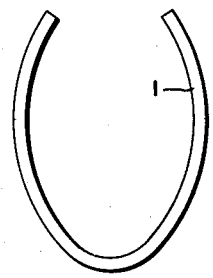

The tubing may be bent to the desired hair-pin or U-shape by conventional means, and after this operation it will appear as the U-shaped tubular member 1 in FIGURE 1. In this condition, of course, the tubular member contains internal stresses as the result of the cold working. If stress relief is attempted by heating the tube in an annealing furnace in unrestrained condition, the tube will be distorted. Some common forms of distortion are indicated in FIGS. 2 and 3 and it should be noted that in the annealed tube shown in FIG. 2 the legs of the U have actually crossed. The tube legs may bow badly as shown in FIG. 3. Other forms of distortion of long U-tubes are known to those in the art. On the other hand, if the tube is mounted in a heat exchanger in the unannealed condition stress corrosion of the stainless steel tubing is inevitable at the service temperatures employed. In addition, the tubes may deform during use and thereby the heat exchanger will not operate properly.

Figure 4:
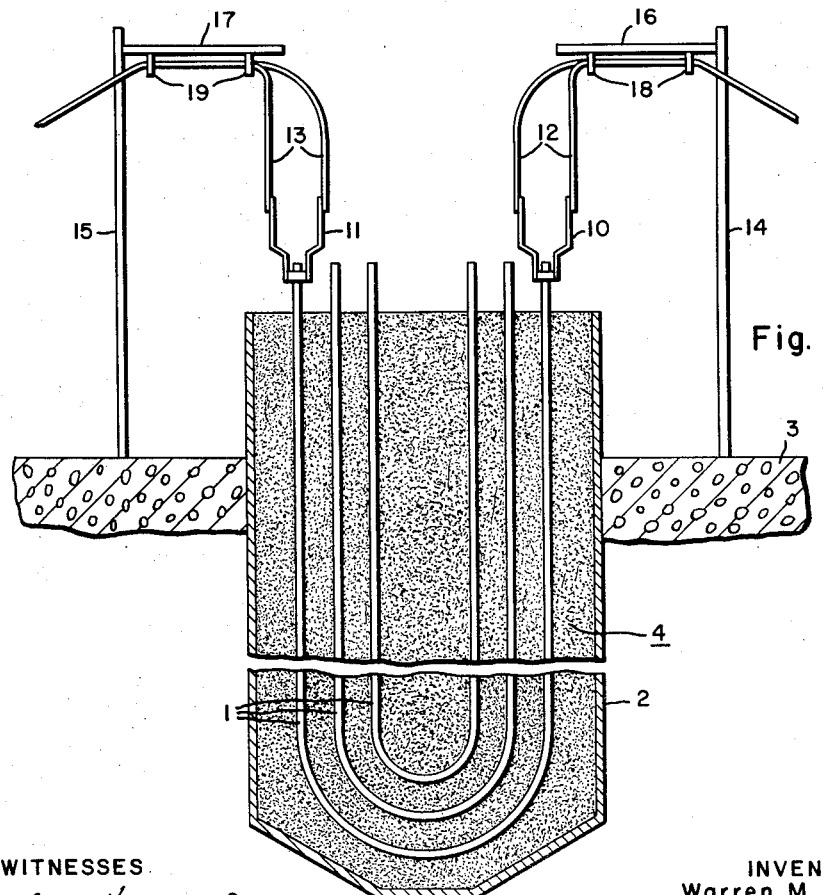
FIG. 4 is an elevational view, partly in section, of a vertical annealing tank with tubes positioned for annealing treatment.

In accordance with this invention the required relief annealing is accomplished, while at the same time, distortion of the tube is prevented in the apparatus generally indicated in FIGURE 4. As illustrated in FIGURE 4, an annealing box 2 is provided extending below the level of floor 3. The box 2 is deep enough to accommodate the tubes to be treated and receives a plurality of U-shaped tubular members 1 to be annealed without deformation. After placement of the tubes the box is substantially filled with a loose granular refractory material 4. The box 1 may be disposed vertically as shown in FIGURE 4, or horizontally. Tubular members 1 are embedded vertically in the granular refractory material as shown in FIGURE 4 with a few inches of the tube at the ends of the legs protruding from the bed of refractory material 4. The tubes are separated from each other by about five inches of powdered refractory material.

Electric contact clamps 10 and 11 are secured to opposite exposed tube ends of the tubular members 1 (only one pair of such connections is shown in FIGURE 4), and bifurcated electric leads 12 and 13 are connected thereto. It will be understood other types of leads and connectors may be employed. Upright supports 14 and 15 are secured on floor 3 at opposite sides of box 2 and each has a cross arm, 16 and 17 respectively, extending over the box 2. The cross arm 16 has retainers 18 thereon in which lead 12 is secured, and cross arm 17 has retainers 19 for securing lead 13.

Figure 5:
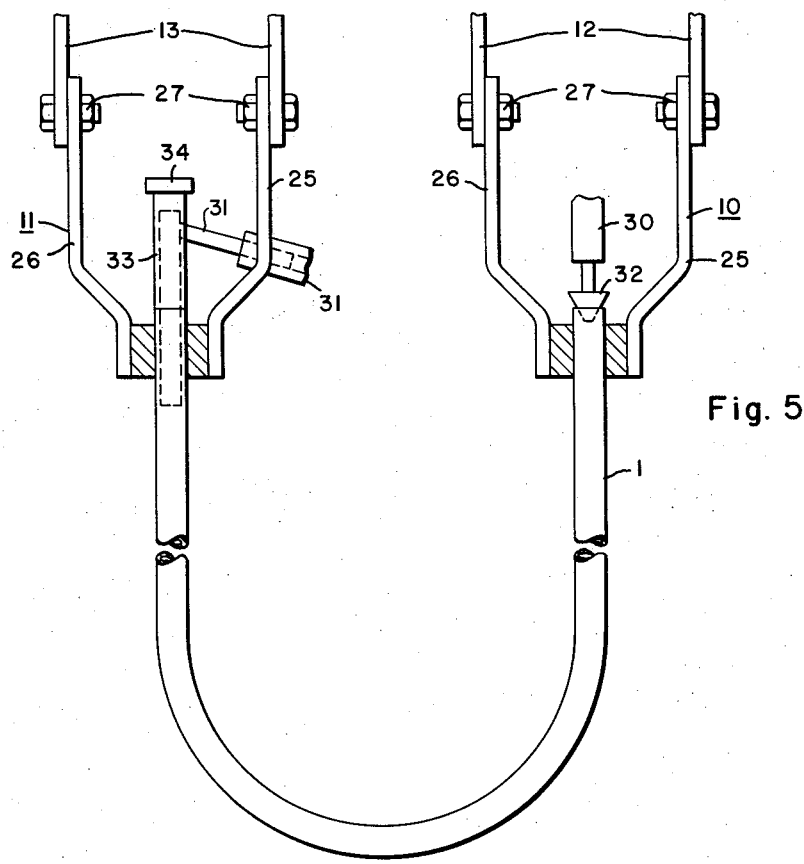
FIG. 5 is a fragmentary elevational view, in part in section, showing details of the electrical and gas line connections to the tube.

An enlarged detail view of the electrical connection at the tube ends is shown in FIGURE 5. Here clamps 10 and 11 are each seen to include a bifurcation with upstanding ears 25 and 26 which mate with the bifurcated leads 12 and 13. The leads are secured to the clamps by conventional means such as the bolts 27. Insulated conduits 30 and 31 are attached to opposite ends of tube 1 between the ears of the bifurcated clamps 10 and 11 for the passage of hydrogen or other inert gas through the tube. Conduit 30 is attached to tube 1 by insulating member 32 and conduit 31 is attached to the opposite end of tube 1 by insulating member 33. The insulating member 33 has a removable closure 34 thereon so that optical viewing instruments may be attached to the member to observe conditions within tube 1 without interrupting the flow of gas therethrough.

By embedding the tubes as described in the powdered refractory material, lateral movement of the tube is effectively restrained. The tube wall movements which take place as the result of heat expansion in the direction of the long axis of the tube are readily accommodated since the packing effects little restraint in this direction. Movement in this longitudinal direction does not create distortion, with the result that U tubes can be annealed with a minimum of distortion.

There is a problem which arises in cases where relatively massive tubes must be heated to high temperature. Since in these cases heavy currents of electricity are required, heavy power leads must be used to carry the current, and these heavy leads tend to restrict or deflect the movement of the tube in the direction of the long axis. Limitation of movement in this direction is highly undesirable, and therefore, various contact structures are employed to permit free movement of the power leads and the associated tube ends. For example, in the apparatus disclosed in FIGURE 4, if the unsupported length of leads 12 and 13 is excessively heavy, additional support may be provided by using springs to suspend the ends of the leads from the cross arms 16 and 17.

Figure 6:
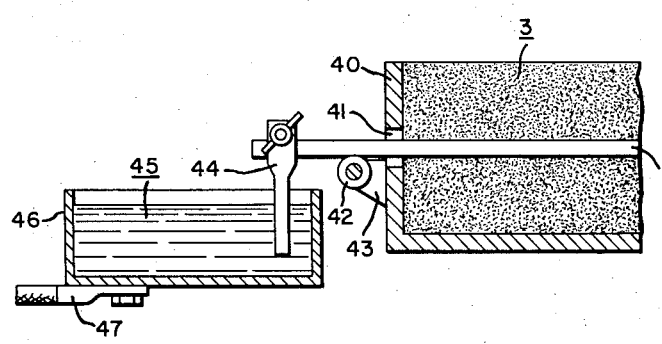
FIG. 6 is a fragmentary view, partly in section, of a horizontal annealing tank showing an alternative electrical connection.

Another lead arrangement, suitable for use with a horizontally disposed annealing box is shown in FIGURE 6 wherein the end of tube 1, which is positioned for annealing treatment, extends through port 41 in the wall of annealing box 40 and is slidably supported by roller 42. The roller 42 is journaled in bracket 43 fixed to the exterior of annealing box 40. Clamp contact 44 is secured to the tube 1 and extends at a right angle downwardly into the interior of container 46 in which there is a mercury pool 45. Power lead 47 contacts container 46 and is bolted thereto. It will be observed that tube 1 is freely movable over the roller 42 and that there is little resistance opposing movement of clamp contact 44 in mercury pool 45.

The process of this invention has been successfully employed to anneal U-tubes having total lengths of as much as 30 feet and having diameters of 5/8 inch and 3/4 inch, with bend radii ranging from 1 7/8 inches to 25 inches. The annealing temperature used for stainless steel was 1940° F., and at this temperature zirconium silicate is preferable to sand because it is a more stable material in contact with stainless steel. A bed of zirconium silicate was used, therefore, and the tubes were embedded in the manner disclosed in FIGURE 4. Hydrogen gas was continuously flowed through the tube during the annealing process to prevent oxidation of the internal wall of the tube. After annealing for from 1 to 5 minutes the tubes were cooled in the refractory bed, and, later, the zirconium silicate was removed. The tubes produced were well-formed with no observable distortion. The internal surfaces were bright and unoxidized.

It is clear that the loose granular refractory material provides both thermal and electrical insulation, and it has some additional beneficial effects in that formation of oxide on the exterior of the tubular member is reduced.

The electrical resistance method of heating the tubular member to be annealed is highly advantageous in that the member is brought up to temperature rapidly and the temperature can be maintained readily. It is preferable to external heating of the member for the reason that external heating is slower and may involve maintaining the member at elevated temperature for undue periods of time. This is due in part, at least, to the insulating properties of the loose refractory material in which the tube is embedded. Heating stainless steel to elevated annealing temperatures for long periods of time has the deleterious effect of inducing carbide precipitation and its undesirable consequences.

Other granular refractory materials may be used such as alumina, magnesite, aluminum silicates, aluminum magnesium silicates, zirconium oxide, or mixtures of two or more.

According to the present invention a simple and effective method has been presented for shaping and stress relieving tubular members without permitting distortion or residual stresses in the member. Certain changes and modifications may be made in the described method without departing from the scope of the invention.

In general, it will be understood that the above specification and drawings are exemplary and not limiting.

We claim as our invention:

1. A process for producing a unitary curved stress relieved metallic member comprising the steps of bending said member to a predetermined curved shape, embedding said curved member to a substantial depth in a body of a loose refractory material with at least one end of said member free of said material, the body of refractory being sufficient to prevent lateral deformation of the curved member during annealing, heating said member to annealing temperature while so embedded, and thereafter removing said member from said refractory material.

2. A process for making a unitary stress relieved metallic tube comprising the steps of, bending said tube to a desired U-shaped configuration, embedding said U-tube to a substantial depth in a body of loose refractory electrically insulating material with at least one end of said tube being free of said material, the body of refractory being sufficient to prevent lateral deformation of the curved member during annealing, annealing said U-tube while so embedded by passing an electric current therethrough to raise its temperature high enough to relieve stresses, cooling the U-tube, and thereafter removing said U-tube from said refractory material.

3. A process for making a unitary stress relieved metallic heat exchanger tube having a U-shaped configuration, comprising the steps of, bending said tube to the desired U shape, embedding said tube to a substantial depth in a body of loose, granular, refractory material having good thermal and electrical insulation properties with the ends of said tube extending clear of said refractory body of material, said body of granular refractory material preventing lateral deformation of said U-tube during heating while permitting movement longitudinally of said tube, establishing and maintaining a flow of inert gas through said tube so that oxidation of the internal surface of the tube is substantially prevented, heating said tube to annealing temperature by passing an electric current therethrough, whereby movement of the tube induced by the heat expansion takes place in the direction of the long axis of the tube, cooling said tube, and subsequently removing said loose refractory material.

4. In a process for making a unitary stress relieved stainless steel tubular member having a U-shaped configuration, the steps of, bending a stainless steel tubular member to the desired U-shape, firmly embedding said member to a substantial depth in granular zirconium silicate with the ends of said member extending free of said zirconium silicate, the zirconium silicate thus preventing lateral deformation of the member during annealing while permitting movement along the longitudinal axis of the member and thermally and electrically insulating said member, providing a flow of hydrogen gas through said tubular member so that a non-oxidizing, non-carburizing condition is established therein, passing an electric current through said tubular member to raise the temperature thereof to annealing level, cooling, and subsequently removing said granular zirconium silicate.

5. A process for producing a unitary stress relieved stainless steel heat exchanger tube having a U-shaped configuration and a total length at least 100 times the tube diameter, comprising the steps of, bending said tube to the desired U-shape, embedding said tube to a substantial depth firmly in a body of granular zirconium silicate, the tube ends extending clear of said body, this arrangement preventing lateral deformation of said tube during annealing while permitting longitudinal movement of said tube and thermally and electrically insulating said tube, flowing hydrogen gas through said tube to minimize oxidation, passing an electric current through the wall of said tube to raise the temperature to about 1940° F. for annealing while maintaining said hydrogen atmosphere within said tube, cooling said tube, and thereafter removing said granular zirconium silicate.

References Cited in the file of this patent

UNITED STATES PATENTS

| | | |
|---|---|---|
| 403,707 | Thomson | May 21, 1889 |
| 1,925,129 | Boyles | Sept. 25, 1933 |
| 2,865,083 | Kater | Dec. 23, 1958 |